(12) United States Patent
Knirck et al.

(10) Patent No.: US 7,364,145 B2
(45) Date of Patent: Apr. 29, 2008

(54) HIGH STIFFNESS FLEXURE

(75) Inventors: Jeffrey G. Knirck, Sunnyvale, CA (US); Paul A. Swanson, Cupertino, CA (US)

(73) Assignee: Equipment Solutions, Inc, Sunnyvale, CA (US)

( * ) Notice: Subject to any disclaimer, the term of this patent is extended or adjusted under 35 U.S.C. 154(b) by 0 days.

(21) Appl. No.: 11/489,041

(22) Filed: Jul. 19, 2006

(65) Prior Publication Data

US 2007/0052144 A1   Mar. 8, 2007

Related U.S. Application Data

(63) Continuation of application No. 10/935,879, filed on Sep. 8, 2004, now abandoned.

(51) Int. Cl.
*F16F 1/18* (2006.01)

(52) U.S. Cl. ........................... 267/160; 267/182
(58) Field of Classification Search ............... 267/160, 267/148, 149, 158, 182
See application file for complete search history.

(56) References Cited

U.S. PATENT DOCUMENTS

| | | |
|---|---|---|
| 4,468,014 A | 8/1984 | Strong |
| 4,559,717 A | 12/1985 | Scire et al. |
| 4,740,854 A | 4/1988 | Shibuya et al. |
| 4,802,659 A | 2/1989 | Hope |
| 4,987,507 A | 1/1991 | Steltzer |
| 5,027,241 A | 6/1991 | Hatch et al. |
| 5,269,846 A | 12/1993 | Eskelinen et al. |
| 5,356,519 A | 10/1994 | Grabscheid et al. |
| 5,429,106 A | 7/1995 | Martin et al. |
| 5,492,313 A | 2/1996 | Pan et al. |
| 5,550,669 A | 8/1996 | Patel |
| 5,790,347 A | 8/1998 | Girard |
| 5,877,921 A | 3/1999 | Coon et al. |
| 5,923,500 A | 7/1999 | Hagen |
| 5,997,075 A | 12/1999 | Dunder et al. |
| 6,005,750 A | 12/1999 | Willard et al. |
| 6,129,527 A | 10/2000 | Donahoe et al. |
| 6,373,662 B1 | 4/2002 | Blaeser et al. |
| 6,397,455 B1 | 6/2002 | Hagen |
| 6,442,831 B1 | 9/2002 | Khandros et al. |
| 6,700,747 B2 | 3/2004 | Matz |
| 6,702,082 B2 | 3/2004 | Dörfler et al. |
| 6,863,832 B1 | 3/2005 | Wiemer et al. |
| 2002/0034039 A1 | 3/2002 | Hagen |
| 2002/0096249 A1 | 7/2002 | Meatto et al. |

*Primary Examiner*—Pam Rodriguez
(74) *Attorney, Agent, or Firm*—Fountainhead Law Group, PC; Chad W. Walsh

(57) ABSTRACT

The present invention relates to the design and fabrication of flexures used to guide motion in mechanical systems. A high specific stiffness flexure includes two narrow and thin flexing sections separated by a longer stiffened section. The present invention provides designs and processes for making flexures and flexure systems with monolithic high specific stiffness frame or box structures for the stiffened sections that creates relatively higher self-resonant frequencies.

17 Claims, 6 Drawing Sheets

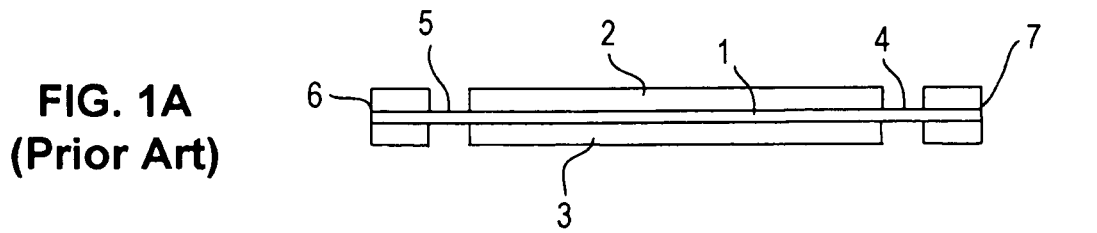
FIG. 1A (Prior Art)
FIG. 1B (Prior Art)
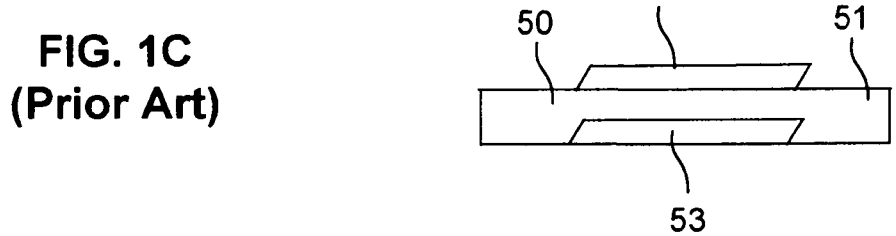
FIG. 1C (Prior Art)
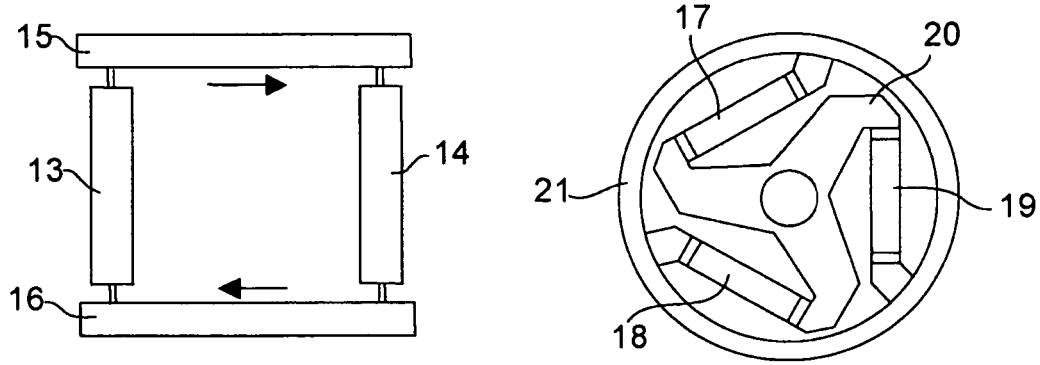
FIG. 2A (Prior Art)
FIG. 2B (Prior Art)

HIGH STIFFNESS FLEXURE

This application is a continuation of and claims priority to abandoned U.S. patent application Ser. No. 10/935,879, entitled "High Stiffness Flexure," filed on Sep. 8, 2004 now abandoned.

BACKGROUND

The present invention relates to flexures, and more particularly to a high stiffness flexure and a process of making a high stiffness flexure.

A flexure is a flexible mechanical member connecting two bodies. They may be used as a special bearing or hinge to guide the linear motion of one or both of the bodies, such as a stage. A properly designed flexure is extremely stiff in every direction except the direction of motion. A major benefit of a flexure guided stage is the complete lack of friction, since no part is moving against another. Further, there is no backlash in a flexure stage. Most flexure systems are designed to guide motion linearly, although rotary flexures also exist. A flexure system can be constructed to be stiff or compliant in any number of allowed axes. A simple linear flexure is a strip of metal, or other strong material, that is securely attached at one point to one body and securely attached to a second body at another point. In a well designed flexure, the strip is made rigid for most of its length, but is weakened so that it can bend in short segments next to the attachment points.

An inherent limitation of a flexure is its limited motion. Since a flexure is actually a bending beam, its motion is limited by its limited flexural strength. Increased range of motion is allowed by increasing the length of the flexure, but this compromises other qualities of the flexure. Increasing the length of the bending segments also makes the flexure less stiff in the other axes of motion. Increasing the overall length of the flexure increases the mass of the rigid section of the flexure between the two short bending segments. The rigid section between the two bending segments forms a spring-mass system which has resonances. Resonances are undesirable, but higher resonant frequencies are preferable to low resonant frequencies.

The ways that flexures are usually formed can easily lead to a resonant frequency that is low enough to be a real problem or performance limitation in a motion system. Currently, there are two primary methods of creating a flexure. One method, an additive process, shown in FIG. 1A, is to start with a relatively thin strip of flexible material 1 and add rigid strips 2 and 3 in the central section leaving thin bending segments 4 and 5 near each end 6 and 7. Another method, a subtractive process, shown in FIG. 1B, is to start with a relatively thick bar 8 of material and machine notches or slots 9 and 10 near each of the two ends 11 and 12 to form the bending segments with the relatively rigid original bar in between. There are advantages and disadvantages to both approaches. The subtractive process is relatively more expensive, can make a stiffer flexure, and has no joints. The additive process can be less expensive, the bending elements and the central stiffener can be made of different materials, but it has mechanical joints bonding the parts, which can create additional vibration problems. In both cases, the central stiffener is typically solid which makes it stiff but it is also typically massive so that it has a relatively low specific stiffness (i.e., stiffness to mass ratio), which produces a low self-resonant frequency. FIG. 1C shows a flexure which has a center stiffened section created by bending sides 52 and 53 up 90 degrees, forming a "U" channel, leaving segments 50 and 51 to flex. This design does have a higher specific stiffness than a solid bar, but if the sides are made tall to maximize stiffness the sides become cantilevered masses with an additional low self-resonant frequency of their own. With typical flexure design and fabrication practices it is difficult to create a flexure that is compliant enough to act as a flexure and has a high self-resonant frequency.

It generally takes a system of flexure elements to create a functional unit that allows for motion primarily in one axis and is stiff in the other axes. Two such systems are shown in FIG. 2A and FIG. 2B. The system in FIG. 2A allows bodies 15, 16 to move laterally with respect to each other, shown by the arrows. The flexure elements 13, 14 constrain the motion so that the bodies remain parallel. The system in FIG. 2B couples a rigid core 20 with a rigid outer ring 21 with three flexure elements 17, 18, and 19. This system constrains bodies 20, 21 to move concentrically with respect to each other (i.e., in and out of the page). In each case, the flexure elements are formed as described above and shown in FIG. 1A and FIG. 1B. In such systems, each flexure element has resonances due to its shape and material properties (the same if the flexures are the same), and the system has complicated resonances.

What is needed is a flexure with a high stiffness. Furthermore, what is needed is a method for constructing a high stiffness flexure and/or flexure system that is composed of flexure elements with high self-resonant frequencies assembled in a way that minimizes the additional problems of a system. The present invention solves these and other problems by providing high stiffness flexure and method of making a high stiffness flexure as describe below.

SUMMARY

The present invention relates to the design and fabrication of flexures used to guide motion in mechanical systems. A high specific stiffness flexure includes two flexing sections separated-by a longer stiffened frame section. The present invention provides designs and processes for making flexures and flexure systems with monolithic high specific stiffness frame or box structures for the stiffened sections that creates relatively higher self-resonant frequencies. The present invention allows for creating short, thin, flexible segments of a high strength material, and creating the longer central frame section of the flexure with a high specific stiffness from a stiff material formed into a light weight but high stiffness geometry, so that the resonant frequencies are all high.

The following detailed description and accompanying drawings provide a better understanding of the nature and advantages of the present invention.

BRIEF DESCRIPTION OF THE DRAWINGS

FIGS. 1A-C show examples of prior art flexures.

FIGS. 2A-B shows two typical prior art architectures of flexure systems.

DETAILED DESCRIPTION

Described herein are techniques for improving flexures and systems that use flexures. In the following description, for purposes of explanation, numerous examples and specific details are set forth in order to provide a thorough understanding of different aspects of the present invention. It will be evident, however, to one skilled in the art that the present invention as defined by the claims may include some or all of the features in these examples alone or in combination with other features described below, and may further include obvious modifications and equivalents of the features and concepts described herein.

Figure 3A:
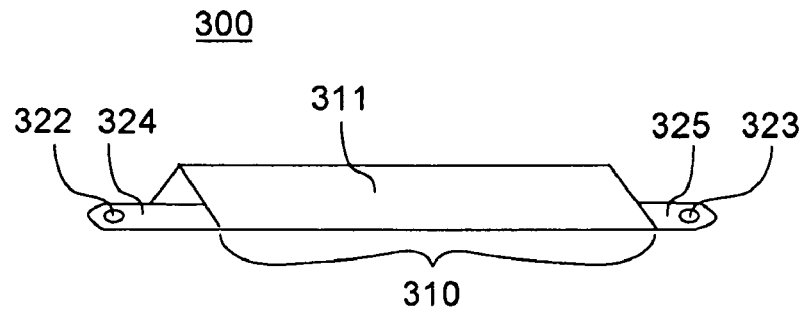
FIG. 3A is an isometric view of an example flexure according to one embodiment of the present invention.

FIG. 3A is an isometric view of an example flexure according to one embodiment of the present invention. Flexure 300 may be made from a spring material such as stainless steel or Beryllium Copper, for example, which may be plated with Tin. It is to be understood that other materials may also be used depending on the application. Exemplary spring materials typically have a high strength so the material can flex across a large angle without breaking or becoming permanently bent. Flexure 300 includes a central stiffened section 310 comprising a stiffening frame 311. Flexure 300 further includes flat spring segments 324 and 325 (i.e., flexing segments). Stiffening frame 311 is a structure that maintains the shape and provides support to the central section 310. Frame 311 may be an open or closed structure adjacent to the flexure base for stiffening the central stiffened section. For example, the cross section of the frame may be a triangle or other shape as described in more detail below. Holes 322 and 323 illustrate example means to mount the flexure between two bodies. However, other mounting configurations may be used. Flat spring segments 324 and 325 are provided between the end holes and the central stiffened section 310, and provide the primary means of flexing.

Figure 3B:
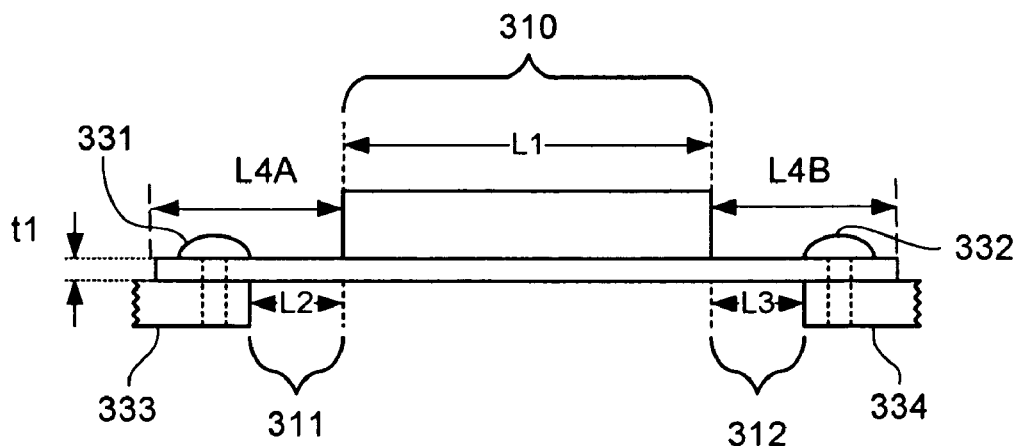
FIG. 3B is a side view of the flexure in FIG. 3A.

FIG. 3B is a side view of the flexure in FIG. 3A. In one specific embodiment, screws 331 and 332 may be used to mount the flexure in a system to rigid bodies 333 and 334. When the flexure is mounted, rigid bodies 333 and 334 may move up or down relative to one another, causing screw 331 to move up or down relative to screw 332. Flexing will occur primarily across flexing regions 311 and 312 of the spring segments 324 and 325, but central stiffened section 310 is designed to be substantially rigid. Flexure 300 may have a thickness t1, and flexing regions may flex across regions 311 and 312 having lengths "L2" and "L3." The length of the central stiffened section 310 is "L1." The spring segments of flexure 300 may have lengths "L4A" and "L4B."

Figure 3C:
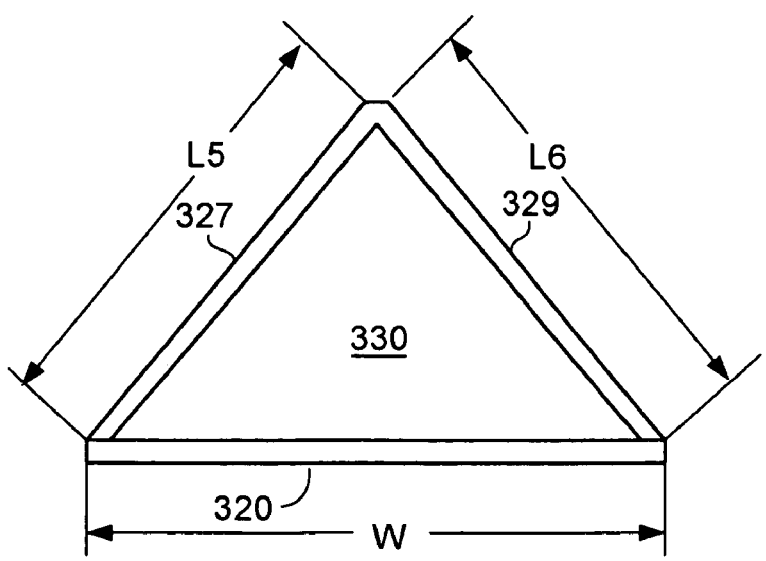
FIG. 3C is a cross section of the flexure in FIG. 3A.

FIG. 3C is a cross section of the flexure in FIG. 3A. In this example, central stiffened section 310 includes a flat base 320 and sidewalls 327 and 329. Base 320 and sidewalls 327 and 329 form a enclosed frame (e.g., a box-type structure) with an interior region 330. In one embodiment, the frame structure is triangular. However, it is to be understood that other shapes for the frame structure may be used, such as polygons or curves such as semicircles or other arcs. Additionally, a circular flexure may have a concentric circular stiffening frame. Base 320 may have a width W, and the sidewalls 327 and 329 of the triangular cross section may have length L5 and L6.

Figure 4A:
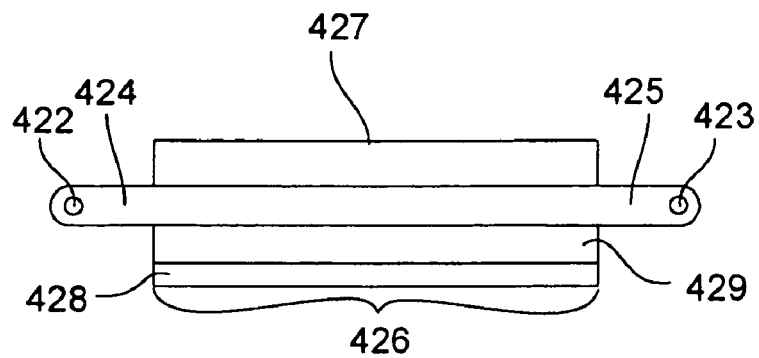
FIGS. 4A-C illustrate an example process of making a high stiffness flexure according to one embodiment of the present invention.
Figure 4B:
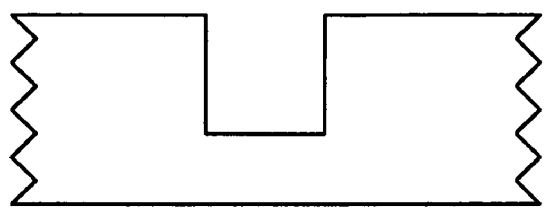
Figure 4C:
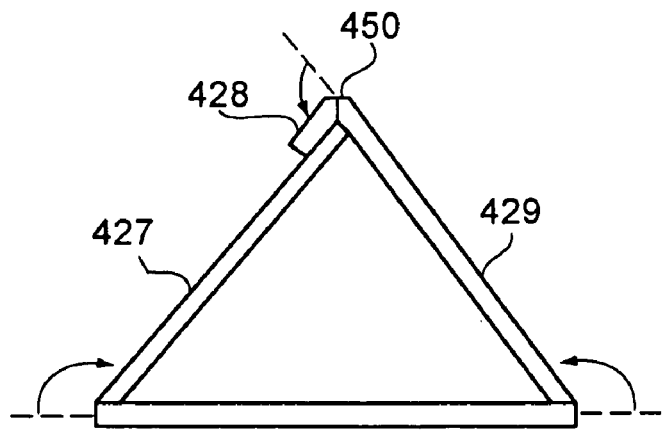

FIGS. 4A-C illustrate an example method of forming a flexure according to one embodiment of the present invention. FIG. 4A shows an unfolded view of an individual flexure including flexing segments 424, 425 and the mounting holes 422, 423. FIG. 4C illustrates a cross section of the integral flexure. As illustrated in FIG. 4C, sides 427 and 429 may be folded toward each other to meet at the apex 450 of triangular cross section stiffened section 426. Lap joint portion 428 is included to provide an overlapping joint (i.e., a "lap joint") with side 427.

In one embodiment, the flexure pattern may be cut from a sheet of spring material using a die, laser or EDM. Alternatively, the flexure pattern may be chemically etched from a sheet of spring material. If the flexure pattern is formed from a single sheet of material, there may be no preferential bend lines, unless perforations are added. Thus, the flexure may be formed by a machine.

FIG. 4B illustrates a method of forming a flexure according to one embodiment of the present invention. As shown in FIG. 4B, bend lines are created along folding lines to facilitate folding of the flexure elements. For example, a chemical etching process can provide a partial depth etch along folding lines to produce weakened lines to facilitate folding. If the partial etch it sized properly, a small or moderate size flexure can be readily folded by hand, for example.

FIGS. 4A-C illustrate a flexure where the stiffened section is formed integral to the flexure from a single piece of material. This technique is preferable because it creates a monolithic flexure. Alternatively, a high specific stiffness frame structure could be formed separately and bonded to a flat flexure. While similar results would be achieved, superior stiffening elements could be used at the cost of an additional bond between the flat flexure and the stiffener.

The stiffened section of the flexure can take various forms. FIGS. 3-4 illustrate flexures with triangular cross sectional stiffened sections. Alternatively, an additional side can be added to the pattern that would form a four-sided box structure. The box structure can take the form of a polygon cross section like a triangle, rectangle or trapezoid, or it could be a smooth curve like an arc. A rectangular cross section body has a higher specific stiffness, and therefore a higher self-resonant frequency, than a similar height triangular cross section body. However, for a given base width and total perimeter length, the triangle has the highest specific stiffness. A triangular cross section provides a closed shape so that unsupported sides won't resonant. Triangular cross sections are also advantageous because they are self-supporting in that such a structure cannot be folded into a parallelogram then collapse.

Independent of how the flexure is fabricated and what material the flexure is made from, the stiffening frame structure should be a closed shape so that the stiffened section acts as a single stiff monolithic body. If the frame structure is created by folding, the edges that come together to close the shape should be bonded together. A lap joint may be used as shown in FIG. 4C, and bonded by welding, brazing or soldering. A overlapping tape could be also be used, such as an adhesive tape with a strong substrate, for example.

A partial chemical etching process may produce weakened corners where the material was made thin to aid bending. This problem can be solved or reduced a couple of ways. One way is to leave the material its full thickness at the corners of the stiffened section adjacent to the flexing segments where the peeling stresses are concentrated. Another way, not mutually exclusive, is by filling, or partially filling, the stiffened section with a material for increasing the strength of the frame. For example, a low density substance like epoxy or rubber may be used to stabilize the structure without adding much mass. This filler material could also have damping qualities to help damp any resonance that gets excited. Alternatively, for damping, a damping material could be added to outside surfaces of the flexure.

If Tin plated Beryllium Copper alloy is used for the base spring material, a soldered lapjoint may be used to close the body on the stiffened section as shown in FIG. 4C. Solder can also be used in the inside corners as buttresses like the addition of epoxy as a filler mentioned previously. If steel is used for the base spring material, spot welding may be used. Beryllium Copper alloy is also non-magnetic unlike steel. Since steel is magnetic, it may interact with magnetic fields in the system, such as in a motor, for example.

Figure 5:
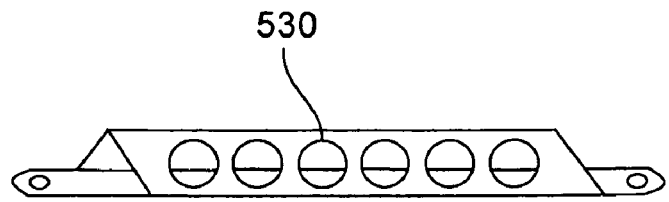
FIG. 5 is a flexure according to another embodiment of the present invention.

FIG. 5 is a flexure according to another embodiment of the present invention. As illustrated in FIG. 5, the specific stiffness of the central stiffened section can be further increased by providing lightening holes in the sides and or the base. This decreases the stiffness but can significantly increase the stiffness to weight ratio, which increases the self-resonance frequency. FIG. 5 shows an isometric view of an individual flexure with lightening holes 530 in the side.

Figure 6:
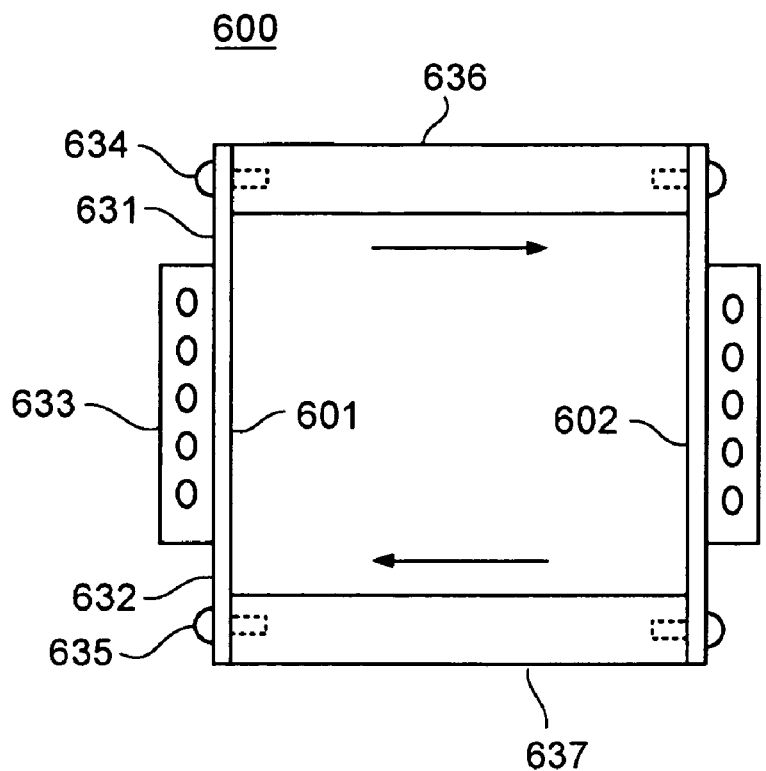
FIG. 6 is an example of a system using a flexure according to one embodiment of the present invention.

Flexures according to embodiments of the present invention may be incorporated into improved flexure systems. FIG. 6 is an example of a system using a flexure according to one embodiment of the present invention. Flexure system 600 includes bodies 636 and 637 that move laterally with respect to each other, shown by the arrows. Flexure elements 601 and 602 constrain the motion so that the bodies remain parallel. Flexure elements 601 and 602 are comprised of flexing segments 631 and 632 and central stiffened section 633. Flexure element 601 is attached to bodies 636 and 637 by screws 634 and 635. Flexure element 602 may be attached to bodies 636 and 637 in the same way.

Figure 7:
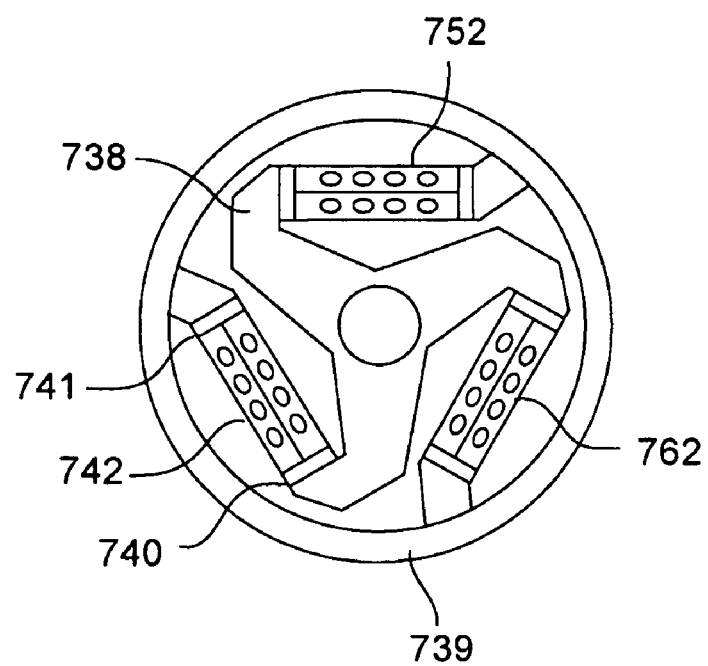
FIG. 7 is another example of a system using a flexure according to one embodiment of the present invention.

FIG. 7 is another example of a system using a flexure according to one embodiment of the present invention. The system in FIG. 7 includes a rigid core 738 coupled to a rigid outer ring 739 using three flexure elements 742, 752 and 762. Each flexure element comprises flexing segments 740 and 741 and a central stiffened section located between 740 and 741. This system constrains bodies 738 and 739 to move concentrically with respect to each other (i.e., in and out of the page). The rigid core 738 could also be monolithic with the three flexure elements (i.e., a single piece of material), and the flexure elements may take the form of frames or box structures to achieve high stiffness and low mass as described above. Rigid outer ring 739 may he similarly constructed monolithic with the flexure elements.

Figure 8:
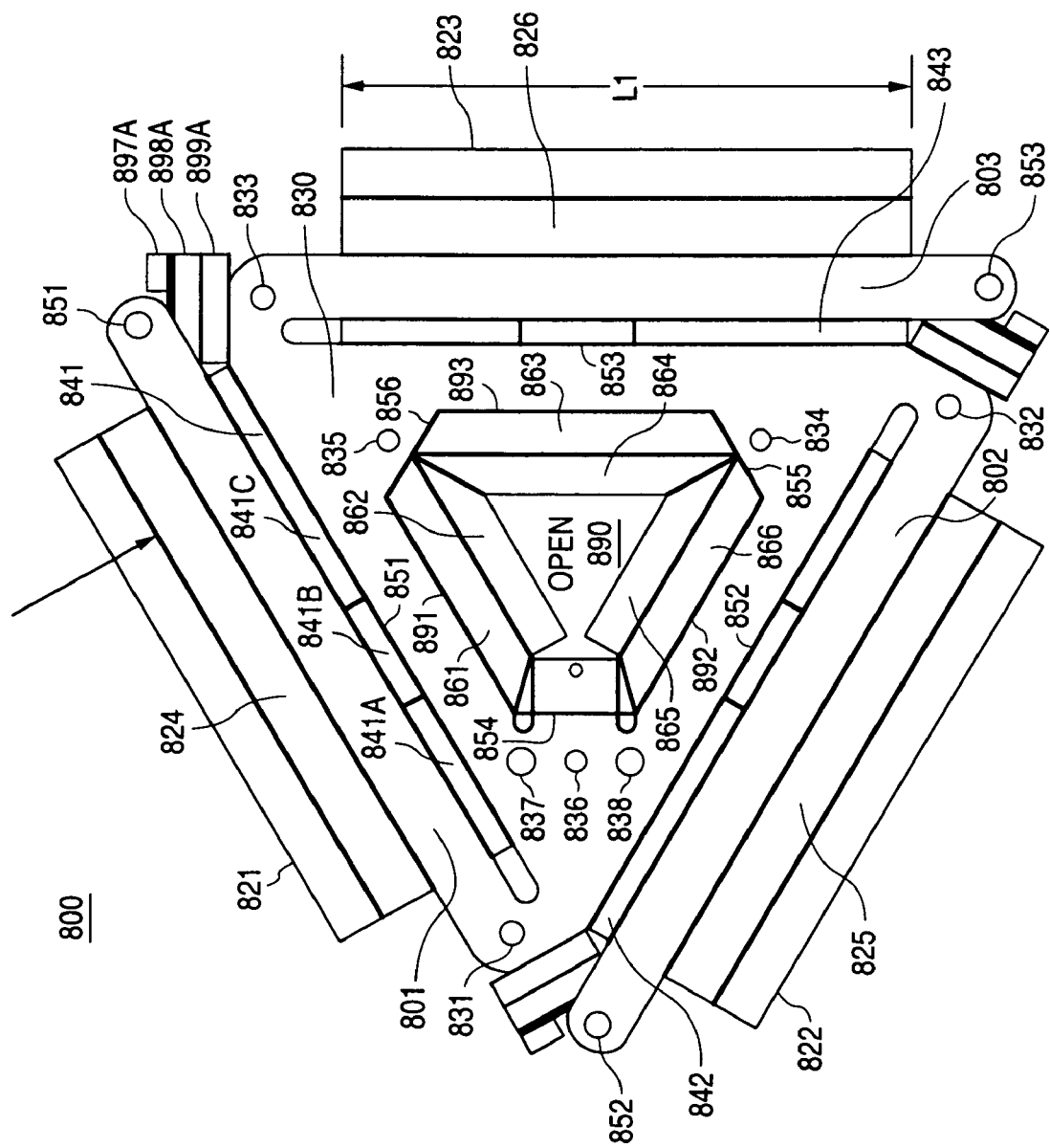
FIG. 8 illustrates an example of a flexure system and a process of making a high stiffness flexure according to one embodiment of the present invention.

FIG. 8 illustrates an example of a flexure system 800 and process of forming a flexure according to one embodiment of the present invention. A flexure system may include a rigid central core 830 coupled to a plurality of flexures 801, 802 and 803. In the present example, the core 830 is an advantageous triangular shape and three flexures 801, 802 and 803 are positioned in parallel with each side of the core. The core may be attached to a first body at the inner flexure segments (e.g., using holes 831, 832 and 833 or holes 834, 835 and 836), and the outer segments of each flexure may be attached to a second body (i.e., using holes 851, 852 and 853) so that the first and second bodies may move laterally (in and out of the page in FIG. 8) with respect to each other. Additional holes 837-838 may optionally be positioned around the core for attaching other elements of the first body or other bodies to the core. In one embodiment, the core includes an opening 890. The opening may be centered in the triangle to achieve a balanced center of gravity, for example. In one embodiment, both the core 830 and the central opening 890 are triangular (e.g., an equilateral triangle), and the sides of the central opening 891-893 are parallel with the sides of the core 851-853 and the flexure elements 801-803, respectively. Additionally, each apex of the triangular central opening may be flattened (i.e., each apex of the triangular central opening consists of a flat edge such as edges 854, 855 and 856) to increase the rigidity of the core.

FIG. 8 also illustrates another aspect of the present invention. In one embodiment, individual flexures, or in this example the whole flexure system 800, may be produced from a single sheet of spring material and then formed into a final product, wherein the core, flexures and stiffening frames comprise a single piece of material. For example, in one embodiment a single sheet of spring material is chemically etched or cut into the desired pattern (e.g., a triangle or other shape of the desired core and flexure(s)). The pattern may include stiffening sections 821-826 and lap joint sections 841-843, which may be patterned and folded to form triangular frames for stiffening a central section of each flexure across a length L1. The stiffening sections 821-826 may be bonded to lap joint sections 841-843 along the entire length L1 to form tightly coupled frame units on each flexure with relatively few and relatively high self-resonant frequencies.

In another embodiment, the core 830 may include stiffening frames as well. For example, a single piece of material may include core stiffening sections 861-866, which may be folded to form triangular stiffening frames across the sides 891-893 of opening 890 and the parallel sides 851-853 of core 830 after the system has been patterned (e.g., by stamp cutting or etching). In this case, lap joint sections 841-843 may be divided into three sections as illustrated by lapjoint sections 841A, 841B and 841C, with the end sections (e.g., lap joint sections 841A and 841C) forming lap joints with the stiffening sections (e.g., stiffening section 861) and the middle lap joint sections (e.g., lap joint section 841B) forming lap joints with the core stiffening sections 861-866. Similarly, the region between the flexure core and the inner flexure segments may also include stiffening frames illustrated by sections 897A, 898A and 899A. Sections 897A, 898A and 899A may be included at each corner of the triangle, for example, and folded to stiffen the corner from flexing.

Figure 9A:
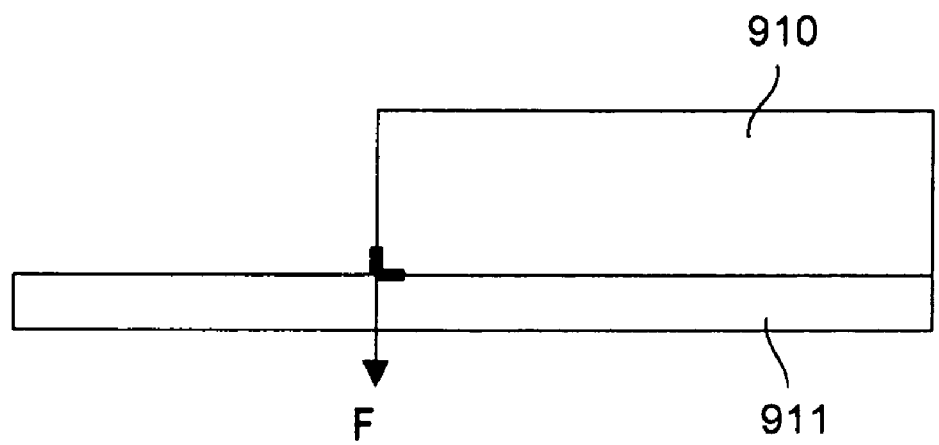
FIGS. 9A-B illustrates another method of forming a flexure according to one embodiment of the present invention.
Figure 9B:
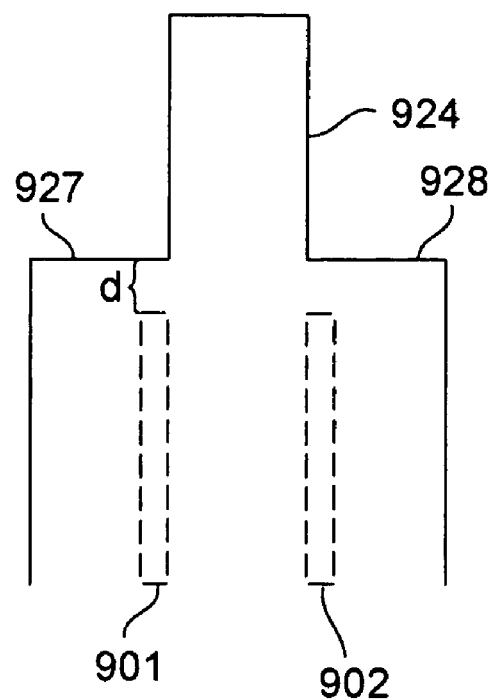

FIGS. 9A-B illustrates another method of forming a flexure according to one embodiment of the present invention. FIG. 9A illustrates a force F exerted when the flexure is bending. In this case, a downward force is exerted that may tend to cause the stiffening frame 910 to separate from the base of the flexure 911 at the corner (i.e., a peeling stress). FIG. 9B illustrates a solution to this potential problem. In FIG. 9B, bend lines 901 and 902 are set back a distance "d" from the corners. Thus, if the bend lines are formed by a partial etch as described above, or by some other method that tends to weaken the material, the corners of the stiffening frame will be unaffected. Consequently, the flexure will be more resistant to tearing at the corners. In one embodiment, a mask may be used to etch the bend lines, wherein the mask window is set back from the corner created at the intersection of the flexing segment 924 and the frame sides 927 and 928.

The above description illustrates various embodiments of the present invention along with examples of how aspects of the present invention may be implemented. Furthermore, embodiments of the present invention may be used in many different applications. For example, one of the many possible applications for the present invention is as guidance for a voice coil actuator used as either a positioning stage or a reciprocating pump.

Thus, the above examples and embodiments should not be deemed to be the only embodiments, and are presented to illustrate the flexibility and advantages of the present invention as defined by the following claims. For example the flexure pattern could be cut from a relatively thick sheet material and then the short flexing segments formed by etching the material thinner in those spots. Any necessary bonding could be done by welding or gluing. Other means of attaching to the flexure could be used. Dowel pins or sets of two screws, instead of single screws, could be used to attach the flexure to a body to prevent rotation about a single screw, for example. Based on the above disclosure and the following claims, other arrangements, embodiments, implementations and equivalents will be evident to those skilled in the art and may be employed without departing from the spirit and scope of the invention as defined by the claims.

What is claimed is:

1. A flexure for guiding the relative motion of first and second bodies comprising: a first flexing segment coupled to the first body; a second flexing segment coupled to the second body; and a stiffening frame section between the first and second flexing segments having a first end coupled to the first flexing segment and a second end coupled to the second flexing segment, wherein the distance between the first end and the second end defines a length of the stiffening frame, wherein the stiffening frame has at least one sidewall, and wherein a cross section taken perpendicular to the length of the frame defines an enclosed structure with an interior region.

2. The flexure of claim 1 wherein the stiffening frame comprises:
   a flat base portion defining a base of the stiffening frame;
   a first frame side; and
   a second frame side, wherein the flat base side, the first frame side, and the second frame side form an enclosed triangular frame.

3. The flexure of claim 2 further comprising a lap joint for securing at least one of the base of the stiffening frame, the first frame side, or the second frame side to another of the base of the stiffening frame, the first frame side, or the second frame side.

4. The flexure of claim 3 wherein the flat base portion, the first frame side, the second frame side, and the lap joint comprise a single piece of material folded to form said enclosed triangular frame.

5. The flexure of claim 1 further comprising means for mounting the first flexing segment to the first body and means for mounting the second flexing segment to the second body.

6. The flexure of claim 1 wherein the enclosed structure is triangular.

7. The flexure of claim 1 wherein the enclosed structure is a polygon.

8. The flexure of claim 1 wherein the enclosed structure is a curved shape.

9. The flexure of claim 1 wherein the first flexing segment, the second flexing segment, and the stiffening frame are a single piece of material.

10. The flexure of claim 1 wherein the interior region is filled with a material for increasing the strength of the frame.

11. The flexure of claim 1 wherein the frame includes a plurality of holes for decreasing the weight of the flexure.

12. The flexure of claim 1 wherein the flexure comprises Beryllium Copper, Steel, a Beryllium Copper alloy, or Tin Plating.

13. A flexure system for guiding the relative motion of at least two bodies comprising: a plurality of flexures, each including first and second flexing segments and a stiffening frame section between the first and second flexing segments having a first end coupled to the first flexing segment and a second end coupled to the second flexing segment, wherein the distance between the first end and the second end defines a length of the stiffening frame, wherein the stiffening frame comprises at least one sidewall, and wherein a cross section of the stiffening frame taken perpendicular to the length of the frame defines an enclosed structure with an interior region; a first body attached to the first flexing segments of each of the plurality of flexures; and a central core attached to the second flexing segments of each of the plurality of flexures.

14. The flexure system of claim 13 wherein the plurality of flexing segments, the stiffening frames, and the central core are a single piece of material.

15. The flexure system of claim 13 wherein the central core comprises a plurality of sides, and wherein each side of the central core is parallel to one of the plurality of flexures.

16. The flexure system of claim 13 wherein the central core includes an opening.

17. The flexure system of claim 13 wherein the central core includes a plurality of stiffening frames for stiffening the central core.

* * * * *